United States Patent Office 3,658,828
Patented Apr. 25, 1972

---

3,658,828
UNSYMMETRICAL DIALKYL THIAZOLE SULFENAMIDES
John Joseph D'Amico, Akron, Ohio, assignor to Monsanto Company, St. Louis, Mo.
No Drawing. Filed Nov. 19, 1969, Ser. No. 878,243
Int. Cl. C07d 91/44
U.S. Cl. 260—306.6 A      5 Claims

ABSTRACT OF THE DISCLOSURE

Unsymmetrical dialkyl thiazole sulfenamides of the formula

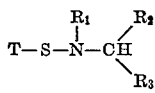

wherein T is benzothiazolyl or substituted benzothiazolyl, where the substituents are chloro, bromo, fluoro, iodo, nitro or lower alkoxy, $R_1$ is tertiary-alkyl of 4–12 carbon atoms, $R_2$ and $R_3$ are alkyl of 1–8 carbon atoms or together with the carbon atom to which they are attached form cycloalkyl of 5–8 carbon atoms are delayed-action accelerators.

---

This invention relates to new thiazole sulfenamides. More particularly, it relates to unsymmetrical thiazole sulfenamide accelerators having a tertiary-alkyl radical and a secondary-alkyl or cycloalkyl radical attached to the sulfenamide nitrogen.

BACKGROUND OF THE INVENTION

The N,N-dialkyl thiazolesulfenamides were among the first thiazolesulfenamide accelerators discovered but general commercial acceptance lagged behind that of monoalkyl and cycloalkyl analogues. Some of them are liquids whereas solids are preferred because of easier purification, longer shelf life and greater convenience in mixing with rubber. Thiazolesulfenamides possess delayed action, a property which is valuable because of the processing safety it imparts. One theory of delayed action relates increasing delayed action to increasing steric hindrance but increasing steric hindrance of dialkyl amines increases difficulty of forming the sulfenamide.

Processing safety is a property which has great economic importance because in its absence rubber stocks ofttimes partially vulcanize before they can be shaped into useful articles. Fortunately, when styrene butadiene copolymer rubber became a commercial reality the delayed action thiazolesulfenamide accelerators had already been discovered and were available for use. The higher temperatures generated in the processing of styrene butadiene copolymer rubber intensified the prevulcanization of scorch problem. However, even higher processing temperatures came into use and more scorchy carbon blacks were introduced so that improved delayed-action accelerators have been continually needed.

SUMMARY OF THE INVENTION

It has now been discovered that highly sterically hindered thiazolesulfenamides containing one tertiary-alkyl and one secondary-alkyl or cycloalkyl on the amide nitrogen form in good yields from the corresponding highly sterically hindered secondary amines. In spite of the lack of symmetry, the products are stable solids at ordinary temperatures and possess special delayed-action accelerating properties. The compounds of this invention may be represented by the formula:

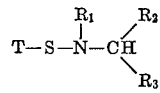

wherein T is benzothiazolyl or substituted benzothiazolyl, where the substituents are chloro, bromo, fluoro, iodo, nitro or lower alkoxy, $R_1$ is tertiary-alkyl of 4–12 carbon atoms, $R_2$ and $R_3$ are alkyl of 1–8 carbon atoms or together with the carbon atom to which they are attached form cycloalkyl of 5–8 carbon atoms.

Examples of tertiary-alkyl radicals suitable for the practice of this invention are tertiary-butyl, tertiary-amyl, tertiary-hexyl, tertiary-octyl, tertiary-nonyl, tertiary-decyl and tertiary-dodecyl. A tertiary-alkyl radical has its first carbon atom linked to three other carbon atoms.

The aliphatic groups from which $R_2$ and $R_3$ can be selected include alkyl groups containing from 1–8 carbon atoms having straight or branched chains, for example, methyl, ethyl, propyl, isopropyl, butyl, secondary-butyl, amyl, hexyl and octyl. Cyclopentyl, cyclohexyl and cyclooctyl are examples of radicals when $R_2$ and $R_3$ together with the carbon to which they are attached form cycloalkyl.

Compounds of this invention may be produced by the oxidative condensation of the appropriate secondary amine with a thiazole mercaptan or disulfide. Amines used in the preparation of these compounds are known. For example, N-isopropyl-tertiary-butyl amine is reported in Angew. Chem. vol. 72, 1001. N-tertiary-butyl cyclohexyl amine is reported in J. Org. Chem. vol. 29, 2240. Other amines needed to practice the invention can be made by known methods.

DESCRIPTION OF PREFERRED EMBODIMENTS

Example 1

The preparation of N-tert-butyl-N-isopropyl-2-benzothiazolesulfenamide is as follows: 341.6 milliliters of a sodium hypochlorite solution containing 0.75 mole (16.4 grams NaOCl/100 ml.) of sodium hypochlorite is added dropwise at 45–50° C. over a period of one and one-half hours to a slurry containing 84.6 grams (0.5 mole) of 2-mercaptobenzothiazole and 86.4 grams (0.75 mole) N-tert-butyl-N-isopropyl amine in 500 milliliters of isopropyl alcohol. To this reaction mixture 100 milliliters of hot water is added which results in formation of two liquid layers. This mixture is cooled to 30° C. and then added in one portion to 3000 grams of ice water containing 10 grams sodium sulfite. The resulting mixture is stirred at 0–10° C. for one hour. The product is collected by filtration and is washed with cold water until neutral and air-dried at 25°–30° C. 103 grams of a solid representing a yield of 74% is recovered. The product recrystallized from heptane melts at 69°–70° C. Analysis of the product gives nitrogen 9.91% and sulfur 22.72% compared with 9.99% N and 22.87% S calculated for $C_{14}H_{20}N_2S_2$.

Example 2

N - tert. - butyl - N - cyclohexyl - 2 - benzothiazolesulfenamide is prepared in a similar manner except one mole of N - tert. - butylcyclohexylamine is used in place of N-tert.-butyl-N-isopropyl amine. 120 grams (73% yield) of a solid are recovered; recrystallized from heptane the product melts at 93–94° C. Analysis gives 8.79% N and 19.82% S compared to 8.74% N and 20.00% S calculated for $C_{17}H_{24}N_2S_2$.

Example 3

N-tert.-butyl-N-cyclohexyl - 5 - chloro-2-benzothiazolesulfenamide is prepared by the procedure of Example 2 except 5-chloro-2-mercaptobenzothiazole is used in place of the mercaptobenzothiazole. 66 grams (75% yield) of the sulfenamide are recovered. The product recrystallized from ethyl acetate melts at 165°–166° C. Analysis gives 7.88% N and 18.02% S compared to 7.89% N and 18.07% S calculated for $C_{17}H_{23}ClN_2S_2$.

Example 4

N-tert.-butyl - N - cyclohexyl-6-ethoxy-2-benzothiazolesulfenamide is prepared in a like manner by using 6-ethoxy-2-mercaptobenzothiazole. 57 grams (63% yield) of a solid which melts at 106°–107° C. after recrystallization from alcohol is obtained. Analysis of the product gives 7.52% N and 17.59% S compared to 7.68% N and 17.59% S calculated for $C_{19}H_{28}N_2OS_2$.

The new compounds can be used as accelerators in the vulcanization of natural and synthetic sulfur-vulcanizable rubbers. The special properties of the new delayed-action sulfenamides in rubber stocks compounded in styrene butadiene rubber and in blends of styrene butadiene rubber with polybutadiene rubber are shown below.

The amount of accelerator used depends on a number of factors such as process conditions, type of elastomer, use of the vulcanized product, other components in the recipe and other variable to which the compounder must address himself. The amount is, however, usually within the range of 0.1 to 5 parts by weight, and more often within the range of 0.3 to 2 parts by weight per 100 parts by weight of rubber. The preferred usage generally falls within the range of 0.5 and 1.5 parts by weight accelerator.

A styrene-butadiene masterbatch is used to test the accelerating activity of the new compounds. The masterbatch is prepared by milling the following ingredients:

MASTERBATCH

| | Parts by weight |
|---|---|
| Styrene-butadiene rubber | 100.0 |
| Carbon Black (HAF) | 52.2 |
| Stearic acid | 2.0 |
| Zinc oxide | 4.0 |
| Hydrocarbon softener | 10.0 |
| Total parts | 168.0 |

Vulcanizable stocks are prepared by incorporating the accelerator, sulfur, and an antidegradant into the masterbatch. The antidegradants used are Santoflex 13 which is N(1,3-dimethylbutyl)N' - phenyl - p - phenylenediamine and Santoflex 77 which is N,N'-bis(1,4-dimethyl pentyl)-p-phenlenediamine. Curing characteristics are determined by means of the Monsanto Oscillating Disk Rheometer described by Decker, Wise and Guerry in Rubber World, December 1962, page 68. From the Rheometer data the maximum torque is recorded in Rheometer units. Mooney scorch times are determined by means of a Mooney Plastometer. The time in minutes ($t_5$) required for the Mooney viscosity to rise five points above the minimum viscosity is recorded. Longer times are indicative of greater processing safety.

A similar masterbatch, except that it contains two parts less carbon black, is used to prepare stocks containing the new accelerators. The effect on processing safety of substituents in the benzothiazole portion of the molecule is demonstrated.

TABLE II

| Stock | I | J | K |
|---|---|---|---|
| Masterbatch | 166.0 | 166.0 | 166.0 |
| Sulfur | 1.75 | 1.75 | 1.75 |
| Santoflex 77 | 3.0 | 3.0 | 3.0 |
| N-tert-butyl-N-cyclohexylbenzothiazolesulfenamide | 0.5 | | |
| N-tert-butyl-N-cyclohexyl-5-chloro-benzothiazolesulfenamide | | 0.5 | |
| N-tert-butyl-N-cyclohexyl-6-ethoxy-benzothiazolesulfenamide | | | 0.5 |
| Mooney scorch at 135° C. ($t_5$) | 25.9 | 32.1 | 25.3 |

As further examples of the processing safety of the compounds of the invention, vulcanizable compositions are compounded comprising the following stocks:

MASTERBATCH

| Ingredients: | Parts |
|---|---|
| Oil extended SBR | 137.5 |
| Carbon black (ISAF) | 65.0 |
| Stearic acid | 1.0 |
| Zinc oxide | 3.0 |
| Hydrocarbon softener | 1.5 |
| Total | 208.0 |

TABLE III

| Stock | L | M | N |
|---|---|---|---|
| Masterbatch | 208.0 | 208.0 | 208.0 |
| Sulfur | 1.8 | 1.8 | 1.8 |
| Santoflex 13 | 2.0 | 2.0 | 2.0 |
| N,N'-diisopropyl-2-benzothiazolesulfenamide | 1.2 | | |
| N-tert-butyl-N-isopropyl-2-benzothiazolesulfenamide | | 1.2 | |
| N-tert-butyl-N-cyclohexyl-2-benzothiazolesulfenamide | | | 1.2 |
| Mooney scorch at 135° C. ($t_5$) | 36.0 | 42.5 | 44.5 |

MASTERBATCH

| Ingredients: | Parts |
|---|---|
| Styrene-butadiene rubber | 68.75 |
| Cis-4-polybutadiene rubber | 50.0 |
| Carbon black (HAF) | 60.0 |
| Stearic acid | 2.0 |
| Zinc oxide | 3.0 |
| Total | 183.75 |

TABLE IV

| Stocks | O | P | Q | R | S |
|---|---|---|---|---|---|
| Masterbatch | 183.75 | 183.75 | 183.75 | 183.75 | 183.75 |
| Sulfur | 1.75 | 1.75 | 1.75 | 1.75 | 1.75 |
| Santoflex 13 | 3.0 | 3.0 | 3.0 | 3.0 | 3.0 |
| N,N'-diisopropyl-2-benzothiazolesulfenamide | 1.0 | | | | |
| N-tert-butyl-N-isopropyl-2-benzothiazolesulfenamide | | 1.0 | | | |
| N-tert-butyl-N-cyclohexyl-2-benzothiazolesulfenamide | | | 1.0 | | |
| N-tert-butyl-N-cyclohexyl-5-chloro-2-benzothiazolesulfenamide | | | | 1.0 | |
| N-tert-butyl-N-cyclohexyl-6-ethoxy-2-benzothiazolesulfenamide | | | | | 1.0 |
| Mooney scorch at 135° C. ($t_5$) | 30.7 | 34.6 | 35.4 | 48.4 | 34.0 |

TABLE I

| Stock | A | B | C | D | E | F | G | H |
|---|---|---|---|---|---|---|---|---|
| Masterbatch | 168.0 | 168.0 | 168.0 | 168.0 | 168.0 | 168.0 | 168.0 | 168.0 |
| Sulfur | 2.0 | 2.0 | 2.0 | 2.0 | 2.0 | 2.0 | 2.0 | 2.0 |
| Santoflex 13 | 2.0 | 2.0 | 2.0 | 2.0 | | | | |
| Santoflex 77 | | | | | 2.0 | 2.0 | 2.0 | 2.0 |
| N-tert-butyl-N-isopropyl-2-benzothiazole sulfenamide | 0.5 | 1.0 | | | 0.5 | 1.0 | | |
| N-tert-butyl-N-cyclohexyl-2-benzothiazole sulfenamide | | | 0.5 | 1.0 | | | 0.5 | 1.0 |
| Mooney scorch at 135° C. ($t_5$) | 32.3 | 28.0 | 32.4 | 30.7 | 25.9 | 22.0 | 27.1 | 23.0 |
| Rheometer at 153° C. maximum torque | 66.0 | 70.0 | 63.0 | 67.0 | 62.0 | 67.0 | 60.5 | 65.8 |

MASTERBATCH

| Ingredients: | Parts |
|---|---|
| Natural rubber | 100.0 |
| Carbon black (HAF) | 45.0 |
| Stearic acid | 2.0 |
| Zinc oxide | 3.0 |
| Hydrocarbon softener | 5.0 |
| Total | 155.0 |

TABLE V

| Stocks | T | U | V |
|---|---|---|---|
| Masterbatch | 155.0 | 155.0 | 155.0 |
| Sulfur | 2.0 | 2.0 | 2.0 |
| Santoflex 13 | 2.0 | 2.0 | 2.0 |
| N,N-diisopropyl-2-benzothiazolesulfenamide | 0.6 | | |
| N-tert-butyl-N-isopropyl-2-benzothiazolesulfenamide | | 0.6 | |
| N-tert-butyl-N-cyclohexyl-2-benzothiazolesulfenamide | | | 0.6 |
| Mooney scorch at 121° C. ($t_5$) | 31.6 | 34.6 | 36.5 |

The data show that the unsymmetrical dialkyl sulfenamides have considerably more processing safety than the symmetrical dialkyl sulfenamide control. In certain applications, an immediate economical advantage is accomplished because the need to add prevulcanization inhibitors is eliminated. The data indicate that substituents on the benzothiazolyl portion of the molecule do not adversely effect the scorch advantage achieved by the unsymmetrical sulfenamides.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A compound of the formula

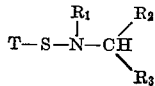

wherein T is benzothiazolyl or substituted benzothiazolyl, where the substituents are chloro, bromo, fluoro, iodo, nitro or ethoxy, $R_1$ is tertiary-alkyl of 4–12 carbon atoms, $R_2$ and $R_3$ are alkyl of 1–8 carbon atoms or together with the carbon atom to which they are attached form cycloalkyl of 5–8 carbon atoms.

2. A compound according to claim 1 wherein T is benzothiazolyl, $R_1$ is tertiary-butyl and $R_2$ and $R_3$ are methyl.

3. A compound according to claim 1 wherein T is benzothiazolyl, $R_1$ is tertiary-butyl and

is cyclohexyl.

4. A compound according to claim 1 wherein T is 5-chlorobenzothiazolyl, $R_1$ is tertiary-butyl and

is cyclohexyl.

5. A compound according to claim 1 wherein T is 6-ethoxybenzothiazolyl, $R_1$ is tertiary-butyl and

is cyclohexyl.

References Cited
UNITED STATES PATENTS 3,161,648  12/1964  Rodgers et al. _____ 260—306.6

ALEX MAZEL, Primary Examiner

R. J. GALLAGHER, Assistant Examiner

U.S. Cl. X.R.

260—788